(12) United States Patent
Seyanagi et al.

(10) Patent No.: US 7,455,799 B2
(45) Date of Patent: Nov. 25, 2008

(54) METHOD OF PRODUCING POLISHING PAD-USE POLYURETHANE FOAM AND POLYURETHANE FOAM

(75) Inventors: Hiroshi Seyanagi, Osaka (JP); Kaoru Inoue, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 345 days.

(21) Appl. No.: 10/513,524

(22) PCT Filed: May 7, 2002

(86) PCT No.: PCT/JP02/04441

§ 371 (c)(1),
(2), (4) Date: Nov. 4, 2004

(87) PCT Pub. No.: WO03/095518

PCT Pub. Date: Nov. 20, 2003

(65) Prior Publication Data

US 2005/0222288 A1 Oct. 6, 2005

(51) Int. Cl.
*B29C 44/34* (2006.01)

(52) U.S. Cl. ........................ 264/50; 264/41; 264/176.1; 264/212; 425/4 R; 521/79; 521/155; 521/170

(58) Field of Classification Search ................ 521/79, 521/155, 170; 425/4 R; 264/41, 50, 176.1, 264/212
See application file for complete search history.

(56) References Cited

U.S. PATENT DOCUMENTS

| | | | |
|---|---|---|---|
| 4,030,637 A | 6/1977 | Boden et al. | |
| 4,207,279 A * | 6/1980 | Boon | 264/54 |
| 4,927,861 A | 5/1990 | Souto et al. | |
| 5,055,272 A | 10/1991 | Wheeler et al. | |
| 5,578,362 A | 11/1996 | Reinhardt et al. | |
| 5,725,420 A | 3/1998 | Torii | |
| 5,840,782 A | 11/1998 | Limerkens et al. | |
| 5,900,164 A | 5/1999 | Budinger et al. | |
| 6,022,903 A | 2/2000 | Younes et al. | |
| 6,200,901 B1 | 3/2001 | Hudson et al. | |
| 6,410,608 B1 | 6/2002 | Sakai et al. | |
| 6,437,013 B2 | 8/2002 | Kuwamura et al. | |
| 6,777,455 B2 | 8/2004 | Seyanagi et al. | |
| 2002/0183409 A1 | 12/2002 | Seyanagi et al. | |
| 2005/0064709 A1 | 3/2005 | Shimomura et al. | |

FOREIGN PATENT DOCUMENTS

| | | |
|---|---|---|
| JP | 33-7833 | 9/1958 |
| JP | 42-11869 | 7/1967 |
| JP | 52-35176 | 3/1977 |
| JP | 59-179136 | 10/1984 |
| JP | 1-222868 | 9/1989 |
| JP | 1-259043 | 10/1989 |
| JP | 2-138328 | 5/1990 |
| JP | 3-14847 | 1/1991 |
| JP | 6-220151 | 8/1994 |
| JP | 6-267915 | 9/1994 |
| JP | 8-12794 | 1/1996 |
| JP | 8-500622 | 1/1996 |
| JP | 11-302355 | 11/1999 |
| JP | 11-322877 | 11/1999 |
| JP | 2000-17252 A | 1/2000 |
| JP | P3013105 | 2/2000 |
| JP | 2000-178374 | 6/2000 |
| JP | 2001-47355 A | 2/2001 |
| JP | 2001-176829 A | 6/2001 |
| JP | 2001-179608 A | 7/2001 |
| JP | 2001-277101 A | 10/2001 |
| JP | 2001-358101 A | 12/2001 |
| WO | WO 94/04599 | 3/1994 |
| WO | WO 01/96434 | 12/2001 |
| WO | WO 01/96434 A1 | 12/2001 |

\* cited by examiner

*Primary Examiner*—John Cooney
(74) *Attorney, Agent, or Firm*—Knobbe Martens Olson & Bear, LLP

(57) ABSTRACT

A production method comprising the step of charging prepolymer, a foaming agent and an active hydrogen-containing compound in specified amounts into a tank and foaming/mixing them for a specified time by a mixer, and the subsequent step of pouring the mixture liquid into a metal mold.

5 Claims, 4 Drawing Sheets

METHOD OF PRODUCING POLISHING PAD-USE POLYURETHANE FOAM AND POLYURETHANE FOAM

This application is the U.S. National Phase under 35 U.S.C. §371 of International Application PCT/JP02/04441, filed May 7, 2002. The International Application was not published under PCT Article 21(2) in English.

BACKGROUND OF THE INVENTION

1. Field of the Invention

The present invention relates to a method of producing a polishing pad-use polyurethane foam and a polyurethane foam produced by such a method.

2. Description of the Related Art

With respect to a polishing method for smoothing a wiring formation face on a semiconductor substrate efficiently with high precision, a CMP (Chemical Mechanical Polishing) method has been adopted. This method is a polishing method in which chemical functions and mechanical functions are utilized in a combined manner, and makes it possible to flatten the semiconductor substrate (wafer surface) over a wide range.

Some of polishing pads to be used in this CMP method are formed by a polyurethane foam so that fine recessed sections are formed on the surface with polishing slurry being maintained therein.

With respect to a known technique for a producing method of such a polishing pad-use polyurethane foam, for example, Japanese Patent Application Laid-Open No. 11-322877 has disclosed a producing method. In this producing method, upon mixing and stirring two solutions of an isocyanate-terminated prepolymer and an active hydrogen-containing compound, unfoamed heat-expansive fine hollow spherical particles (hollow balloons) are preliminarily added and mixed in either of the prepolymer and the active hydrogen-containing compound, and by utilizing reaction heat released when the two solutions are allowed to react with each other and cured or externally-applied heat, the unfoamed heat-expansive fine hollow spherical particles are finely foamed in the urethane molded product so that the molded product is allowed to contain the heat-expanded fine hollow spherical particles.

Moreover, Japanese National Publication of International Patent Application No. 8-500622 has disclosed a producing method as another known technique. In this producing method, an isocyanate-terminated prepolymer and an active hydrogen-containing compound (MBOCA) together with expanded fine hollow particles are simultaneously put into a special mixer in which the fine hollow particles are fully kneaded in a short reaction time, and evenly dispersed and mixed.

However, the hollow balloons of this expanded type are a powder material having a specific gravity of about 0.04 g/cm$^3$, and it is difficult to fully knead and evenly mix the hollow balloons in this state with the urethane solution. The reason for this is explained as follows: since there is a great difference in density between the reaction solution and the hollow balloons, the hollow balloons tend to float up during the curing process, causing a difficulty in forming an even product. With respect to the hollow balloons of this expansive type, void balloons with holes are contained in a pre-expansion stage, and dusts, which have adhered to pipes and the like in the expansion process to be deposited thereon, and are burned through heat to form hard foreign matters, are also contained therein. Such hardened foreign matters remaining in urethane tend to cause scratches in the polishing process, resulting in a serious problem. In this manner, a producing process of a polyurethane foam by the use of hollow balloons tends to cause adverse effects.

The present invention has been devised to solve the above-mentioned problems, and its objective is to provide a producing method of a polishing pad-use polyurethane foam, which can produce a polyurethane foam that is evenly formed and less susceptible to deviations in specific gravity through processes without using hollow balloons.

SUMMARY OF THE INVENTION

In order to solve the above-mentioned problems, the method of a producing polishing pad-use polyurethane foam in accordance with the present invention has the steps of: charging a first component, a foaming agent and a second component that reacts with the first component to form polyurethane in specified amounts into a tank and foaming/mixing them for a specified time by a mixer, and after the above-mentioned step, pouring the mixed solution into a mold so as to react with one another to be cured.

With this arrangement, the first component (for example, prepolymer), the foaming agent and the second component are charged into a tank and foamed and mixed by a mixer for a predetermined time. Thus, a gas such as air is forcefully involved therein so that the mixture is finely dispersed and foamed. In other words, different from the conventional technique, it becomes possible to carry out a foaming process through a method without using hollow balloons. The inventors of the present invention have found that the amounts of the first component, the foaming agent and the second component (for example, an active hydrogen-containing compound) to be charged into the tank and the stirring time are appropriately controlled so that a polyurethane foam that is evenly formed and less susceptible to deviations in specific gravity is prepared.

With respect to the charging process of the first component, the foaming agent and the second component into the tank in the abovementioned mixing process, these materials may be charged simultaneously, or some of the respective elements are first charged into the tank, and stirred and mixed, and after a lapse of predetermined time, the rest of the elements may be charged and stirred.

Here, with respect to the method of producing a fine-bubble polyurethane foam by using the producing method of the present invention, the following two methods are proposed:

(1) Prepolymer Method

A method, which produces a fine-bubble polyurethane foam by mixing a first component containing an isocyanate-group-containing compound and a second component containing an active hydrogen-containing compound, is provided with the steps of: adding a silicon-based nonionic surfactant having no hydroxide group to at least either of the first component and the second component; stirring the component to which the surfactant has been added with a non-reactive gas so that the non-reactive gas, preferably, air, is dispersed as fine bubbles therein to form a bubble dispersion solution; and mixing the rest of the components in the bubble dispersion solution to be cured.

In this method, more specifically, an isocyanate prepolymer with isocyanate group terminals is used as the first component, and after this component has been formed into a bubble dispersion solution, the solution is crosslinked by using a chain-extension agent such as MBOCA serving as the second component; or a prepolymer with hydroxide group terminals is used as the second component, and after this component has been formed into a bubble dispersion solution, the solution is crosslinked by using an isocyanate compound such as diphenylmethane diisocyanate serving as the first component.

(2) One-shot Method

A method, which produces a fine-bubble polyurethane foam by mixing a first component containing an isocyanate-group-containing compound and a second component containing an active hydrogenv-containing compound, is provided with the steps of: adding a silicon-based nonionic surfactant having no hydroxide group to at least either of the first component and the second component; mixing and stirring the first component and the second component with a non-reactive gas, preferably air, so that the non-reactive gas is dispersed as fine bubbles therein to form a bubble dispersion solution; and curing the bubble dispersion solution.

In this producing method, a polyol compound forming polyurethane, a chain-extension agent and a polyisocyanate compound are mixed to form a bubble dispersion solution, and the solution, as it is, is cured.

The amount of addition of the surfactant is preferably set in a range from 1 to 20% by weight with respect to the total amount of the first and second components.

In a preferable mode of the present invention, the above-mentioned mixer is provided with a first mixer blade and a second mixer blade having shaft centers in the vertical direction, and the first and second mixer blades are designed to rotate in reversed directions in a manner so as to engage each other, and also designed so that the two blades do not interfere with each other; thus, a gas is involved in the solution through rotations of the mixer.

The mixer having such a structure is used for foaming and mixing processes. Moreover, by involving a gas such as air in the solution through the rotations of the mixer blades, fine bubbles can be formed.

In another preferable mode of the present invention, a step of raising the first and second mixer blades from the solution face is prepared after the second step, and at this raising process, the solution that has adhered to the first and second mixer blades is allowed to flow downward along the blade portions.

When, upon raising the mixer blades, the solution that has adhered to the mixer blades drops onto the solution face with splashes, air voids tend to occur to cause degradation in the quality. Therefore, this arrangement in which the solution is allowed to flow downward along the blade portions makes it possible to allow the solution to flow onto the solution face smoothly and consequently to prevent the occurrence of air voids.

The polyurethane foam formed through the producing method of the present invention has an average cell diameter in a range from 10 to 70 μm with the number of cells in a range from 100 to 700/mm$^2$, and is preferably utilized as CMP polishing-use pads and glass polishing-use pads.

DETAILED DESCRIPTION OF THE INVENTION

Figure 1:
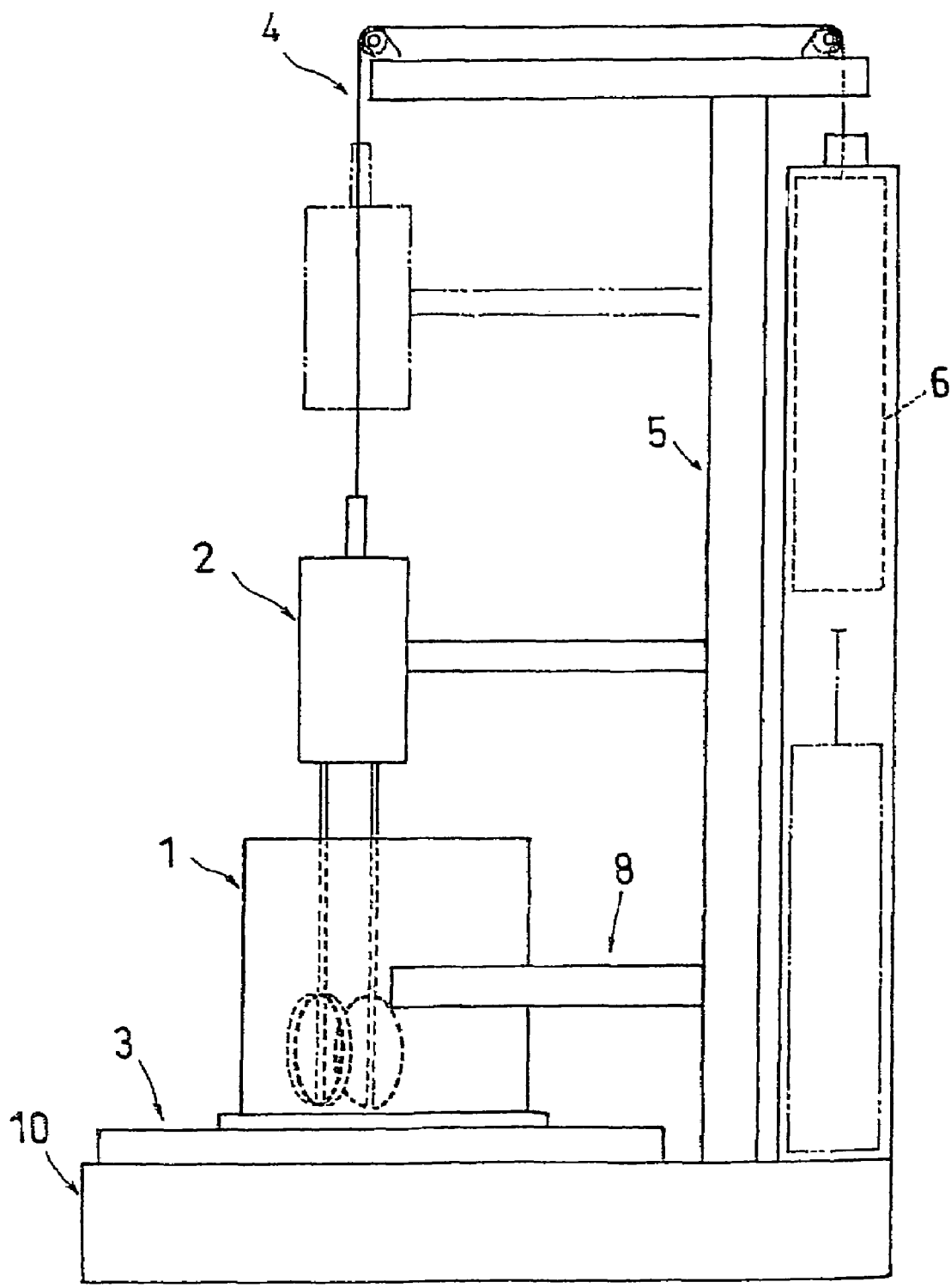
FIG. 1 is a side view that shows a structure of a manufacturing device of a polishing pad-use polyurethane foam.
Figure 2:
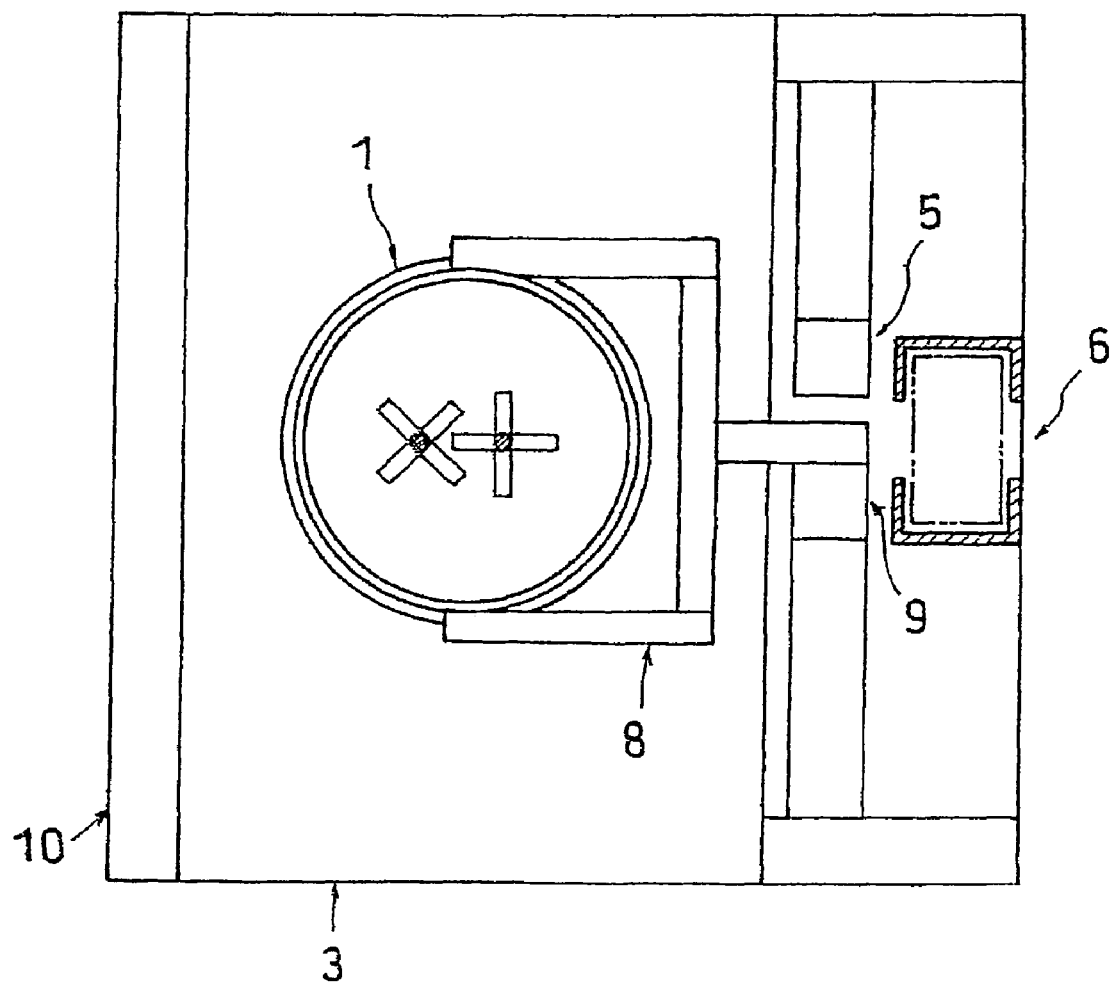
FIG. 2 is a plan view that shows the structure of the manufacturing device of a polishing pad-use polyurethane foam.

Referring to Figures, the following description will discuss preferred embodiments of a manufacturing device of a polishing pad-use polyurethane foam in accordance with the present invention. FIG. 1 is a side view that shows an external structure of a manufacturing device. FIG. 2 is a plan view that shows a structure of the manufacturing device. This manufacturing device aims to obtain a polyurethane foam through processes in which a prepolymer and a foaming agent together with an active hydrogen-containing compound dissolved therein are charged into a tank so as to be foamed and mixed with one another.

This device is provided with a tank 1 used for forming a mixed solution, a mixer 2 used for foaming and mixing the solution in the tank, and a mold 3 to which the solution that has been subjected to the mixing process is injected.

A guide strut 5 on which the mixer 2 is moved upward and downward is installed, and a chain 4 by which the mixer 2 is suspended and a balancer 6 are also installed. By operating a handle (not shown), the mixer 2 is moved upward and downward. The tank 1 is also attached to and supported by another strut through a supporting arm 8 having a virtually C-letter shape in its plan view. The mold 3, which is mounted on a supporting base 10 so as to be supported thereby, is allowed to slide in a direction perpendicular to the drawing face of FIG. 1.

Figure 3:
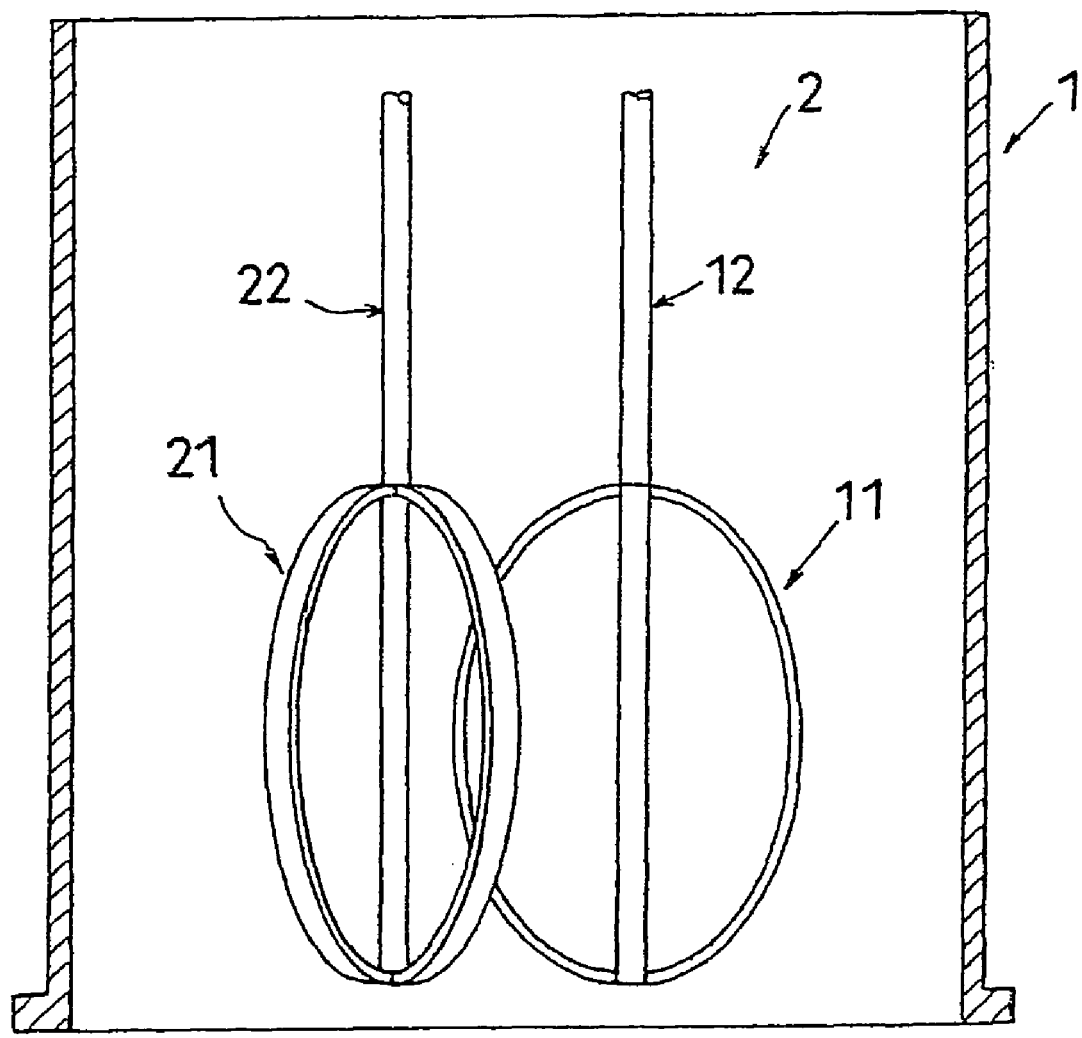
FIG. 3 is a side view that shows a structure of a mixer.
Figure 4:
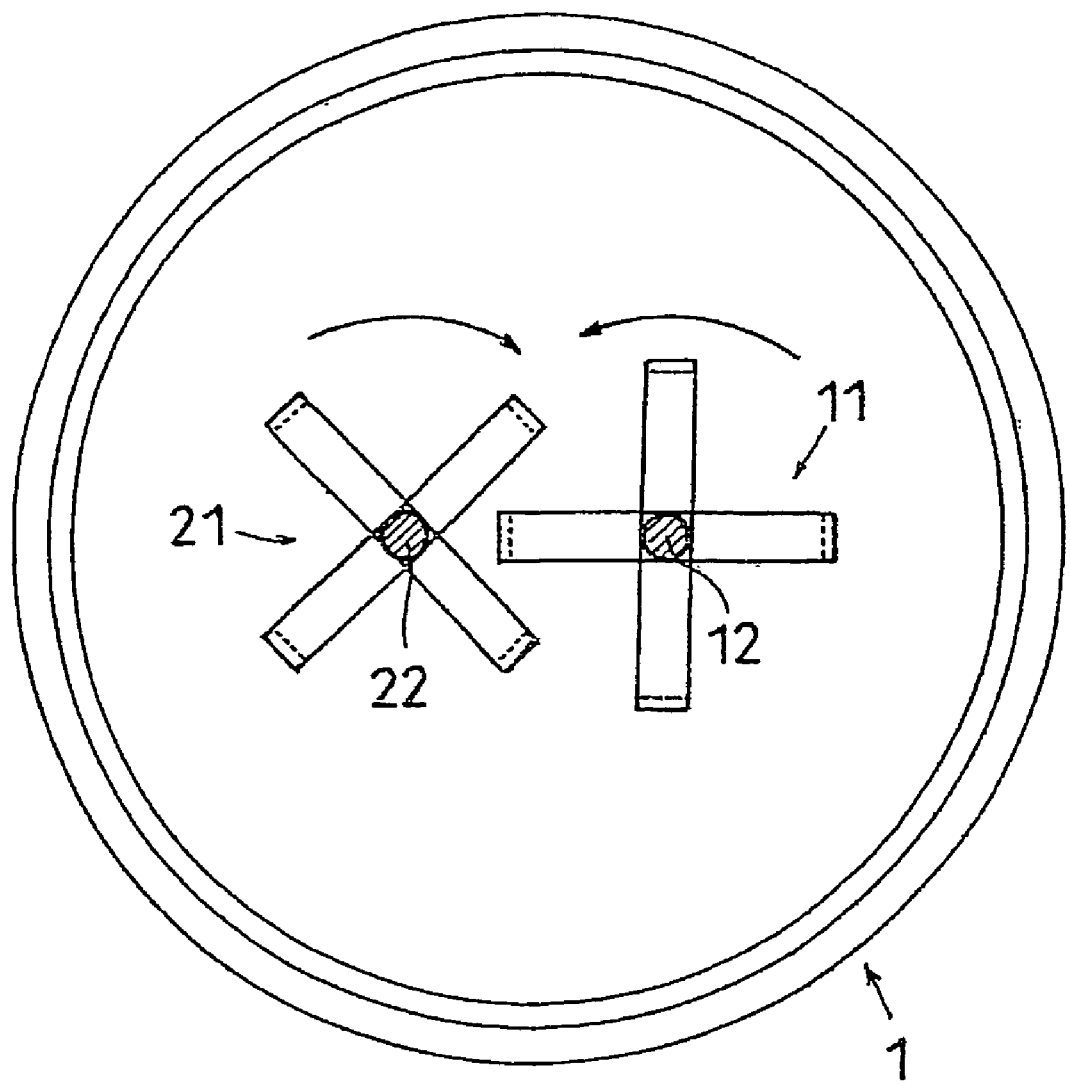
FIG. 4 is a plan view that shows the structure of the mixer.

The following description will discuss a structure of the mixer 2 in detail. FIG. 3 is a side view that shows the structure of the mixer, and FIG. 4 is a plan view that shows the structure of the mixer. This mixer 2, which is a two-axle type mixer, is provided with a first mixer blade 11 and a second mixer blade 21. The first and second mixer blades 11 and 21 have respective rotary shafts 12 and 22, and as shown in FIG. 4, the first mixer blade 11 rotates anticlockwise and the second mixer blade 21 rotates clockwise. Each of the mixer blades 11 and 21 is provided with blade portions that are placed along the circumferential direction with the same intervals (90° pitches). The blade portion of the first mixer blade 11 and the blade portion of the second mixer blade 21 are allowed to rotate in a manner so as to engage each other, with a phase offset of 45° from each other, as shown in FIG. 4; thus, these blades are allowed to rotate without interference with each other. Here, in the example shown in the Figures, four blade portions are prepared; however, a stirring process is available as long as at least two blades are prepared.

As shown in FIG. 3, each of the blade portions has the same shape, such as an arc shape or an elliptical arc shape, or a predetermined smoothly curved shape.

With respect to the shape of the tank 1, the diameter is preferably set to several times longer than the outer diameter of each of the mixer blades 11 and 21, and the height is preferably set to such a level that the solution does not overflow at the time of the mixing process by the mixer. Supposing that the size of a block to be molded is 700 (mm)×150 (mm)× 30 (mm), the required volume (capacity) of the tank 1 is 31.5 L (liters).

Upon completion of the stirring and mixing processes of the mixer 2, it is necessary to raise the mixer blades 11 and 21 from the mixed solution in which these have been located; and at this time, the solution that has adhered to the mixer blades 11 and 21 is allowed to flow down through the shape of each of the blade portions without dropping onto the solution face with splashes.

<Manufacturing Process>

The following description will discuss manufacturing processes of a polyurethane foam in the above-mentioned producing device. This polyurethane foam, which is used as CMP polishing pads, needs to have an even material quality and little deviations in the specific gravity difference among molded products.

The standard blends are: 1 to 20 parts of SH-192 (made by Dow Corning Toray Silicone Company, LTD.) serving as a foaming agent (surfactant) and 26 parts of methylene bis-(O-chloroaniline) (MBOCA) (made by Ihara Chemical Industry Co., Ltd.) (120° C.) serving as an active hydrogen-containing compound are added to 100 parts of adiprene L-325 (made by Uniroyal Chemical Co., Ltd.) (70° C.) serving as an isocyanate-terminated prepolymer.

MBOCA in which specified amounts of adiprene L-325 and SH-192 have been dissolved is charged into a tank 1 and stirred and mixed (mixed so as to be foamed) by a mixer 2. The number of revolutions in each of the mixer blades 11 and 21 is preferably set in a range from 500 to 3000 rpm. The mixing time is preferably set to about several minutes. This stirring process allows air to be involved in the mixed solution.

Here, with respect to the order in which adiprene L-325, SH-192 and MBOCA are charged into the tank 1, these materials may be charged simultaneously, or some of these are first charged thereto and stirred and mixed, and after a lapse of predetermined time, the rest of them may be charged thereto and stirred and mixed.

After completion of the stirring process, the mixer blades 11 and 21 are raised from the solution. At this time, the solution that has adhered to the mixer blades 11 and 21 is allowed to flow down through the shape of each of the blade portions. Therefore, it becomes possible to prevent the occurrence of air voids due to dropped solution with splashes. After the mixer blades 11 and 21 have been raised from the solution, the mixed solution is poured into a mold 3 immediately before the viscosity increases.

A general method for pouring the mixed solution into the mold 3 is a method in which the tank 1 is tilted so as to pour the mixed solution into the mold 3. In a more preferable method, a valve (not shown) is attached to the bottom portion of the tank 1 so that the mixed solution is poured into the mold 3 from the bottom portion. The latter method is more preferable because this method is less susceptible to the occurrence of air voids.

Upon producing a polyurethane foam, the following specific gravity adjusting method is carried out. Supposing that the capacity of the tank 1 up to the position of the uppermost portion of each of the mixer blades 11 and 12 set inside the tank 1 is defined as 100, by charging the solution to the position corresponding to capacity 80, it becomes possible to obtain a block of about 0.8 ($g/cm^3$) when the solution specific gravity is 1.

The properties of the polyurethane foam obtained as described above are explained as follows:

Specific gravity . . . 0.4 to 0.9 $g/cm^3$
Hardness (Shore D) . . . 30 to 60
Average cell diameter . . . 10 to 70 μm
Number of cells . . . 100 to 700/$mm^2$

EXAMPLE 1

In the case when 24.1 kg of adiprene L-325, 0.73 kg (about 3 parts) of the foaming agent SH-192 and 6.32 kg of MBOCA were used, a block having a specific gravity of 0.845 was obtained. At this time, its Shore D Hardness was 54.

EXAMPLE 2

In the case when 21.4 kg of adiprene L-325, 0.81 kg (about 4 parts) of the foaming agent SH-192 and 5.6 kg of MBOCA were used, a block having a specific gravity of 0.781 was obtained. At this time, its Shore D Hardness was 51.

ANOTHER EMBODIMENT

With respect to the shape of each of the mixer blades, not particularly limited by the shape of the present embodiment, various modifications may be made within the scope of the present invention.

The polyurethane foam thus produced may be used not only for CMP polishing pads, but also for glass polishing pads.

What is claimed is:

1. A method of producing polishing pad-use polyurethane foam comprising the steps of:

charging a first component, a foaming agent and a second component that reacts with the first component to form polyurethane in specified amounts into a tank and foaming/mixing them for a specified time by a mixer, wherein the mixer comprises a first mixer blade and a second mixer blade having shaft centers in a vertical direction, and the first and second mixer blades are allowed to rotate in reversed directions in a manner so as to engage each other, and are also designed so that the two blades do not interfere with each other so as to allow a gas to be involved in the solution through rotations of the mixer, wherein the number of revolutions in each of the mixer blades is set in a range from 500 to 3000 rpm, and after the above-mentioned step, pouring the mixed solution into a mold so as to react with one another to be cured, wherein the mixed solution is poured into the mold through a valve attached to a bottom of the tank said mold being disposed underneath the tank, wherein said polyurethane foam has an average cell diameter in a range from 10 to 70 μm with the number of cells in a range from 100 to 700/$mm^2$.

2. The method of producing a polishing pad-use polyurethane foam according to claim 1, further comprising a step of raising the first and second mixer blades from the solution face after the step of foaming/mixing, wherein at this raising process, the solution that has adhered to the first and second mixer blades is allowed to flow downward along the blade portions.

3. A method of producing a polyurethane foam comprising:

loading a first component, a foaming agent, and a second component that reacts with the first component to form polyurethane into a tank;

mixing and foaming the first and second components and the foaming agent in the tank, wherein the mixing is conducted using a first mixer blade and a second mixer blade having shaft centers in a vertical direction and rotating in reverse directions, wherein the first mixer blade and the second mixer blade have smoothly curved shapes to facilitate a portion of the mixture adhering to the blade to flow down along the blades and drip into the mixture without splashes when the blades are separated from the mixture so as to inhibit the occurrence of air voids;

wherein the number of revolutions in each of the mixer blades is set in a range from 500 to 3000 rpm, and pouring the resultant mixture into a mold from a bottom of the tank through a valve attached to said bottom said mold being disposed underneath the tank;
wherein said polyurethane foam has an average cell diameter in a range from 10 to 70 μm with the number of cells in a range from 100 to 700/mm².

4. The method according to claim 3, wherein the first component contains an isocyanate-group-containing compound, the second component contains an active hydrogen-containing compound, and the foaming agent is a silicon-containing nonionic surfactant having no hydroxide group.

5. The method according to claim 3, wherein the mold is allowed to slide in a longitudinal direction of a supporting base.

* * * * *